(12) United States Patent
Davis, Jr. et al.

(10) Patent No.: US 6,793,869 B2
(45) Date of Patent: Sep. 21, 2004

(54) METHOD OF MANUFACTURING A VEHICLE PULL HANDLE ASSEMBLY

(75) Inventors: Joseph J. Davis, Jr., Ortonville, MI (US); Timothy F. O'Brien, White Lake, MI (US)

(73) Assignee: Lear Corporation, Southfield, MI (US)

( * ) Notice: Subject to any disclaimer, the term of this patent is extended or adjusted under 35 U.S.C. 154(b) by 771 days.

(21) Appl. No.: 09/735,241

(22) Filed: Dec. 11, 2000

(65) Prior Publication Data

US 2002/0070484 A1 Jun. 13, 2002

(51) Int. Cl.⁷ .............................................. B29D 22/00
(52) U.S. Cl. ..................... 264/513; 264/572; 264/255; 264/266; 264/271.1; 264/279
(58) Field of Search ................................ 264/513, 572, 264/255, 266, 271.1, 279

(56) References Cited

U.S. PATENT DOCUMENTS

| | | |
|---|---|---|
| 4,047,263 A | 9/1977 | Tietze |
| 4,805,947 A | 2/1989 | Farris |
| 4,981,322 A | 1/1991 | Dowd et al. |
| 4,981,323 A | 1/1991 | Dowd et al. |
| 5,056,838 A | 10/1991 | Tiesler et al. |
| 5,105,521 A | 4/1992 | Dowd et al. |
| 5,173,228 A | 12/1992 | Kargarzadeh et al. |
| 5,298,306 A | 3/1994 | Miller |
| 5,377,450 A | 1/1995 | Varajon |
| 5,519,917 A | 5/1996 | Cordonnier |
| 5,632,061 A | 5/1997 | Smith et al. |
| 5,662,375 A | 9/1997 | Adams et al. |
| 5,855,408 A | 1/1999 | Rickabus |
| 5,868,455 A | 2/1999 | Springer et al. |
| 5,898,973 A | 5/1999 | Schmidt |
| 5,913,562 A | 6/1999 | Mattarella et al. |
| 6,468,457 B2 * | 10/2002 | Corrion et al. ............. 264/242 |
| 6,594,864 B2 * | 7/2003 | Epp et al. ..................... 16/438 |

FOREIGN PATENT DOCUMENTS

DE 29712357 U1 * 9/1997

* cited by examiner

Primary Examiner—Suzanne E. McDowell
(74) Attorney, Agent, or Firm—Bill C. Panagos

(57) ABSTRACT

A method of manufacturing a vehicle pull handle assembly includes injection molding a pull strap portion in the first shot of a multi-shot molding process. The pull strap portion includes a first pivot joint member. A base is over-molded onto the pull strap portion in the second shot of the multi-shot molding process. The base includes a second pivot joint member which pivotally mates with the first pivot joint member but does not chemically bond with the first pivot joint member in the final molded pull handle assembly.

17 Claims, 1 Drawing Sheet

METHOD OF MANUFACTURING A VEHICLE PULL HANDLE ASSEMBLY

FIELD OF THE INVENTION

The present invention relates to a method of manufacturing a vehicle pull handle assembly in which a pull strap portion and base of a pull handle assembly are molded together in a manner such that the pull strap portion and base are pivotally movable with respect to each other in the final assembly.

BACKGROUND ART

Vehicle ingress and egress handle assemblies are provided on vehicles to assist passengers in getting into and out of cars and trucks. Such handles are typically mounted above the door jamb or on the upper portion of a door hinge pillar.

Fixed handles suffer from disadvantages associated with passengers bumping their heads on the handles as they enter or exit the vehicle. To minimize this disadvantage, fixed handles may be located in more difficult to reach locations, which tends to limit their usefulness.

Another approach is to provide an assist strap which has an ingress/egress handle that is biased to a stowed position by a spring. These pivotable assist strap designs require metal hinge pins, which increase manufacturing and assembly costs.

Accordingly, it is desirable to provide a method of manufacturing a vehicle pull handle assembly including a pivotable pull strap, wherein manufacturing and assembly costs are reduced.

DISCLOSURE OF THE INVENTION

The present invention provides a method of manufacturing a vehicle pull handle assembly in which a pull strap portion and base are molded together in a multi-shot molding process such that first and second pivot joint members of the pull strap portion and base, respectively, pivotally engage each other without chemically bonding to each other, thereby providing a pull strap portion which is pivotally mounted to a base in the final molded pull handle assembly.

More specifically, the present invention provides a method of manufacturing a vehicle pull handle assembly in which a pull strap portion is injection molded in the first shot of a multi-shot molding process. The pull strap portion includes a first pivot joint member. A base is over-molded onto the pull strap portion in the second shot of the multi-shot molding process. The base includes a second pivot joint member which pivotally mates with the first pivot joint member but does not chemically bond with the first pivot joint member in the final molded pull handle assembly.

Of course, the order in which the base and pull strap portion are molded can vary in accordance with the present invention. Preferably, a gas assist channel is provided within the pull strap portion for reduced weight. Also, a soft grip material is over-molded onto the pull strap portion.

A spring may be insert molded with the pull handle assembly to pivotally bias the pull strap portion with respect to the base.

The present invention also contemplates a product manufactured by the above-described process.

Accordingly, an object of the invention is to provide an improved method of manufacturing a vehicle pull handle assembly in which manufacturing and assembly costs are reduced, and part count is reduced.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
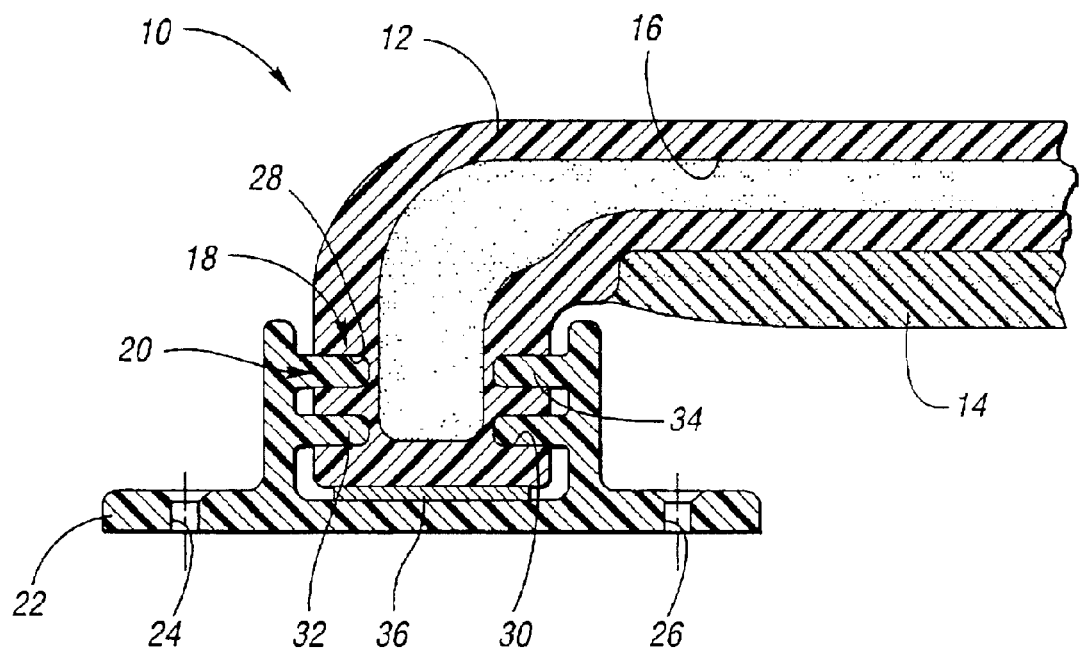
FIG. 1 shows a schematic cut-away vertical cross-sectional side view of vehicle pull handle assembly manufactured in accordance with the present invention.
Figure 2:
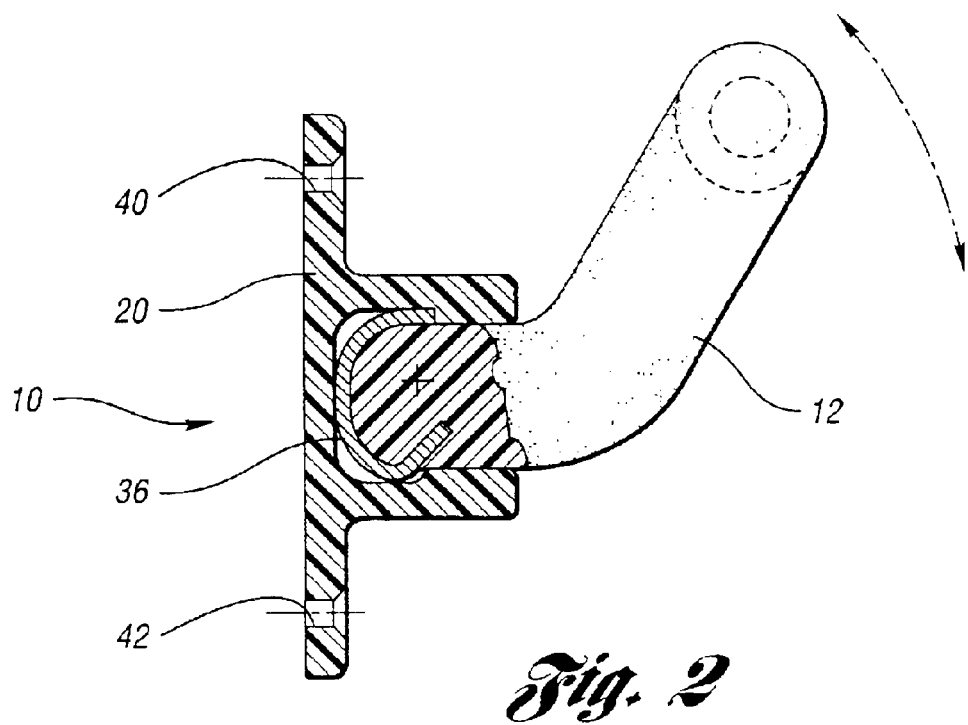
FIG. 2 shows a schematic vertical cross-sectional end view of the assembly of FIG. 1.

A pull handle assembly 10 manufactured in accordance with the present invention is shown schematically in FIGS. 1 and 2. As shown, the pull handle assembly 10 includes a pull strap portion 12 having a soft grip portion 14 over-molded thereon, and a gas assist channel 16 formed in the pull strap portion 12. The pull strap portion 12 also includes a first pivot joint member 18, which pivotally engages a second pivot joint member 20 of a base 22. The base 22 is configured to be mounted to a vehicle door jamb or the upper portion of a door hinge pillar via screw holes 24, 26.

As shown in FIG. 1, the first pivot joint member 18 comprises pivot apertures 28, 30 which are configured to receive the second pivot joint member 20, which comprises a pair of hinge pins 32, 34.

The pull handle assembly 10 also includes a spring 36, which is insert molded with the pull handle assembly 10.

In the preferred embodiment, the pull strap portion 12 is first injection molded from an ABS material, and includes the gas channel 16 formed therein by a gas assisted injection molding process. The soft grip portion 14 is then over-molded onto the pull strap portion 12. The soft grip portion 14 is preferably a soft rubber material, such as sanoprene. The pull strap portion 12, as molded, includes the pivot apertures 28, 30 therein.

The base 22 is then over-molded onto the pull strap portion 12 so that the hinge pins 32, 34 are formed in the pivot apertures 28, 30. The base is preferably molded from a polypropylene material so that it does not chemically bond or adhere with the ABS material of the pull strap portion. Accordingly, in the final molded product, the pull strap portion 12 is rotatable with respect to the base 22 by respective rotation of the hinge pins 32, 34 with respect to the pivot apertures 28, 30. The material selection for the pull strap portion 12 and base 22 are not critical. They need only be dissimilar materials which do not adhere to each other. Another example of materials which would not bond to each other would be PC-ABS and acetyl.

Additionally, the order in which the pull strap portion and base are over-molded onto each other is subject to change within the scope of the present invention. Also, of course, the apertures could be formed in the base, and the hinge pins could extend from the pull strap portion.

The spring 36 may be insert molded with the pull strap portion 12 or with the base 22 in a manner to pivotally bias the pull strap portion in the counterclockwise direction, as viewed in FIG. 2. As shown in FIG. 2, the base 22 includes additional screw holes 40, 42.

While the best mode for carrying out the invention has been described in detail, those familiar with the art to which this invention relates will recognize various alternative designs and embodiments for practicing the invention within the scope of the appended claims.

What is claimed is:

1. A method of manufacturing a vehicle pull handle assembly comprising:

injection molding a pull strap portion in the first shot of a two-shot molding process, wherein the pull strap portion includes a first pivot joint member; and over-molding a base onto the pull strap portion in the second shot of the two-shot molding process, wherein the base includes a second pivot joint member which pivotally mates with said first pivot joint member but does not chemically bond with the first pivot joint member in the final molded pull handle assembly.

2. The method of claim 1, wherein said first pivot joint member comprises a pivot aperture and said second pivot joint member comprises a hinge pin engaged with said pivot aperture.

3. The method of claim 2, further comprising over-molding a soft grip material onto the pull strap portion.

4. The method of claim 3, further comprising forming a hollow channel in the pull strap portion by a gas assisted injection molding process.

5. The method of claim 1, further comprising insert-molding a spring into the pull handle assembly to pivotally bias the pull strap portion with respect to the base.

6. A method of manufacturing a vehicle pull handle assembly comprising:

injection molding a base in the first shot of a two-shot molding process; and injection molding a pull strap portion onto the base in the second shot of the two-shot molding process;

wherein the pull strap portion includes a first pivot joint member and the base includes a second pivot joint member which pivotally mates with said first pivot joint member but does not chemically bond with the first pivot joint member in the final molded pull handle assembly.

7. The method of claim 6, wherein said first pivot joint member comprises a pivot aperture and said second pivot joint member comprises a hinge pin engaged with said pivot aperture.

8. The method of claim 7, further comprising over-molding a soft grip material onto the pull strap portion.

9. The method of claim 8, further comprising forming a hollow channel in the pull strap portion by a gas assisted injection molding process.

10. The method of claim 6, further comprising insert-molding a spring into the pull handle assembly to pivotally bias the pull strap portion with respect to the base.

11. The method of claim 6, wherein said base is injection molded with a material selected from a group of materials consisting of ABS and polypropylene, and said pull strap portion is injection molded with the non-selected member of said group.

12. A method of manufacturing a vehicle pull handle assembly comprising:

injection molding a first pull handle member, wherein the first pull handle member includes a first pivot joint member; and overmolding a second pull handle member onto the first pull handle member, wherein the second pull handle member includes a second pivot joint member which pivotally mates with said first pivot joint member but does not chemically band with the first pivot joint member in the final molded pull handle assembly.

13. The method of claim 12, wherein said first pull handle member comprises a pull strap portion and said second pull handle member comprises a base.

14. The method of claim 12, wherein said first pivot joint member comprises a pivot aperture and said second pivot joint member comprises a hinge pin engaged with said pivot aperture.

15. The method of claim 14, further comprising over-molding a soft grip material onto the pull strap portion.

16. The method of claim 15, further comprising forming a hollow channel in the pull strap portion by a gas assisted injection molding process.

17. The method of claim 13, further comprising insert-molding a spring into the pull handle assembly to pivotally bias the pull strap portion with respect to the base.

* * * * *

UNITED STATES PATENT AND TRADEMARK OFFICE
CERTIFICATE OF CORRECTION

PATENT NO. : 6,793,869 B2
DATED : September 21, 2004
INVENTOR(S) : Joseph J. Davis, Jr. et al.

It is certified that error appears in the above-identified patent and that said Letters Patent is hereby corrected as shown below:

Column 4,
Line 25, delete "band" and insert therefor -- bond --.

Signed and Sealed this

Eighteenth Day of January, 2005

JON W. DUDAS
*Director of the United States Patent and Trademark Office*